Patented Aug. 13, 1940

2,210,965

UNITED STATES PATENT OFFICE 2,210,965

PURIFICATION OF POTABLE WATER

Oliver M. Urbain and William R. Stemen, Columbus, Ohio, assignors to Charles H. Lewis, Harpster, Ohio No Drawing. Application July 3, 1937, Serial No. 151,948

4 Claims. (Cl. 210—24)

This invention relates to the purification of potable water. More particularly, it relates to the removal of fluorides whereby potable waters are rendered less harmful for drinking and industrial purposes.

It has been definitely established that the presence of fluoride ions in potable water, used both for drinking and cooking purposes, is the cause of mottling of tooth enamel. Mottling takes place more especially in children while calcification is taking place. Water containing over one part per million (1 p. p. m.) of fluoride has been shown to cause mottling and, therefore, is harmful for human consumption purposes. The process of this invention will effect the removal of fluorides to a point well below 1 p. p. m. and render such waters fit for domestic consumption.

The waters of many of the states west of the Mississippi River contain fluorides in toxic quantities. Fluorides also occur quite generally in toxic quantities in the water from wells over fifty feet deep in the central and eastern states. As much at 5.0 p. p. m. of fluoride are found in the water from some wells in Ohio. Such waters, which otherwise could be used for domestic purposes without purification, are unfit for use because of the presence of these fluorides.

Activated alumina and other substances for the removal of fluorides have been proposed and are in use. However, these materials often fall short of reducing the fluoride content of water below the toxic point, particularly when the original fluoride content is quite high. With some materials it is necessary to control closely the pH of the solution being treated. With other materials the length of contact time required for the treatment makes the use of such processes disadvantageous. Still other objections to some of the known processes are the excessive costs and the difficulty of regeneration of the materials.

Accordingly it is an object of this invention to provide a simple and efficient method for the removal of fluorides from drinking and industrial waters. More particularly, it is an object to provide a simple and economic method by which the content of fluorides may be reduced below the recognized toxic point of 1 p. p. m. even in waters of high original fluoride content.

Another object of this invention is to provide a method which is operative at any normal pH concentration of the waters being treated.

Another object is to provide a method in which the presence of anions and cations of other salts does not affect in any manner the efficiency of the removal of the fluorides.

An additional object is to provide a method which will permit a short yet efficient contact period.

A further object is to provide a method whereby the treating agent may be quickly regenerated and reused for treatment of additional water.

Broadly, the process of our invention comprises contacting the water containing fluoride ions with a material or compound made by treating a base exchange material with a strong solution of an aluminum salt. We have found that when such base exchange materials are treated with a rather concentrated solution of aluminum salts, there are produced materials having fluoride removing properties to an extent heretofore unknown in the art. Such materials may then be added in powdered form to the liquid being treated in a manner analogous to the present-day use of activated carbon for eliminating taste and odor from potable waters. Alternatively, the materials may be placed in contact filters and the liquid passed through the filters in the conventional manner. By effecting the treatment in this second method, the materials can be readily regenerated at small cost.

More specifically, we form our material by pickling the base exchange compounds, such as natural and synthetic zeolites and the hydrogen permutites, in a solution which is wholly or partially saturated with an aluminum salt such as the sulfate, chloride, nitrate, acetate, or the various alums, for a period of approximately five hours. A suitable concentration of the aluminum salt solution is from 50 to 100% of the amount necessary for saturation. The excess reagent is then drawn off, and the solid mass is washed and, if desired, either air-dried or mechanically dried at a temperature not exceeding 70° C.

We have found that the materials employed in our process may be regenerated in a very short time by using such regenerating agents as soluble aluminum salts, dilute mineral acids, or dilute alkalis. Our experiments have shown that all of these regenerating agents are effective but that the soluble aluminum salts are the most efficient. Regeneration is accomplished by the conventional process of flowing the regenerating agent over the exhausted fluoride removing material.

By such processes, we have effected reduction of fluorine content in a stock solution containing 8.0 p. p. m. of fluorides to a content ranging from zero to a few tenths of 1 p. p. m. Only a fifteen-minute period of contact is necessary, and if the contact filter method is used, the treating agent can be completely regenerated in five minutes.

As exemplary of the results obtained by our process, we give below a series of representative examples. In Examples 1 to 6, inclusive, the treated base exchange material, as specified, was contacted with a stock solution containing 8.0 p. p. m. of fluoride for a period of fifteen minutes. The stock solution contained many different ions, such as magnesium, calcium, iron, sodium, sulfate, chloride, phosphate, etc., and was prepared with tap water. For Examples 7 to 9, a stock solution was prepared with distilled water, free from salts except fluorides, of which the solution contained 10 p. p. m. The quantities employed and the period of contact were the same in all examples. None of the base exchange materials before treatment with the soluble aluminum salts showed any perceptible ability to remove the fluoride ion.

Example No. 1

A sodium zeolite was treated with a strong solution of aluminum sulfate, washed free of sulfate, and then air-dried. This reagent was next contacted with the stock fluoride solution for fifteen minutes. The fluorine was then determined in the solution and found to be 0.5 p. p. m.

Example No. 2

A sodium zeolite (identical with that of Example No. 1) was treated with a saturated 80% ethyl alcohol solution of aluminum chloride, washed free of chlorides, and then air-dried. The residual fluorine content of the stock solution after treatment with this material was found to be 0.4 p. p m.

Example No. 3

A permutite was treated with a strong solution of aluminum sulfate for five hours, washed free of sulfate, and air-dried. This agent reduced the fluorine content of the stock solution sample from 8.0 p. p. m. to 0.4 p. p. m.

Example No. 4

A permutite (identical with that of Example No. 3) was treated with a saturated solution of ammonium alum, washed, and air-dried. This material reduced the fluorine content of the stock solution to 0.9 p. p. m.

Example No. 5

A natural zeolite was treated with a strong solution of aluminum sulfate, washed, and air-dried. The fluorine content was found to be reduced to 0.9 p. p. m.

Example No. 6

Sulfonated coal, a hydrogen permutite, was treated with a strong solution of aluminum sulfate, washed, and air-dried. This material reduced the fluorine content of the stock fluoride solution to 0.1 p. p. m.

Example No. 7

In order to determine if the ions in the tap water interfered with or aided our procedure in any way, we prepared a stock fluoride solution from distilled water. This solution was adjusted to 10.0 p. p. m. of fluorine. The material of Example No. 1 was employed with this stock solution and was found to reduce the fluorine content from 10.0 p. p. m. to 0.3 p. p. m.

Example No. 8

Example No. 7 was repeated using the agent prepared for Example No. 2. The fluorine content in the effluent amounted to 0.3 p. p. m. It is thus definitely established that the presence of foreign ions has no effect on this process. Similar results were obtained when solutions of aluminum nitrate and acetate and various alums were employed as treating agents.

The results of the foregoing examples are tabulated in the following table:

Table

| Example | Fluorine before treatment, p. p. m. | Fluorine after treatment, p. p. m. | Reduction in fluorine, percent |
|---|---|---|---|
| No. 1 | 8.0 | 0.5 | 94 |
| No. 2 | 8.0 | 0.4 | 95 |
| No. 3 | 8.0 | 0.4 | 95 |
| No. 4 | 8.0 | 0.9 | 89 |
| No. 5 | 8.0 | 0.9 | 89 |
| No. 6 | 8.0 | 0.1 | 99 |
| No. 7 | 10.0 | 0.3 | 97 |
| No. 8 | 10.0 | 0.3 | 97 |

We attribute the efficacious removal of fluoride ions by our process to the fact that when base materials are treated with a strong solution of an aluminum salt, chemical reaction results. The base exchange property of the base exchange materials is completely destroyed, and these materials are converted into anion exchange compounds. We have found that the aluminum cannot be washed from our finished product. Therefore, it appears that the aluminum has entered into the chemical structure of the material and that the exchange mechanism of the materials is reversed.

It is to be expressly understood that the foregoing description and the examples we have given are merely illustrative and are not to be considered as limiting our invention beyond the scope of the subjoined claims.

Having thus described our invention, we claim:

1. The process of removing fluorides from water comprising contacting the water with a base exchange material which has been treated with a highly concentrated aluminum salt solution.

2. The process of removing fluorides from water comprising the steps of bringing the water into contact with a base exchange material which has been treated with a highly concentrated aluminum salt solution, regenerating the treated base exchange material when exhausted, and bringing additional quantities of water into contact with the regenerated treated base exchange material.

3. In a process for removing fluorides from water as described in claim 2, the step comprising regenerating the treated base exchange material with a regenerating agent selected from the class of aluminum salt solutions.

4. The process of removing fluorides from water comprising contacting the water with a base exchange material which has been treated with a highly concentrated solution of an aluminum salt selected from the class consisting of aluminum sulphate, chloride, nitrate, acetate, and the alums.

OLIVER M. URBAIN.
WILLIAM R. STEMEN.